US012720613B2

(12) United States Patent
Seok et al.

(10) Patent No.: US 12,720,613 B2
(45) Date of Patent: Aug. 25, 2026

(54) ENHANCED MULTI-LINK SINGLE-RADIO (EMLSR) CHANNEL ACCESS PROCEDURE IN WIRELESS COMMUNICATIONS

(71) Applicant: MediaTek Singapore Pte. Ltd., Singapore (SG)

(72) Inventors: Yongho Seok, San Jose, CA (US); James Chih-Shi Yee, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 270 days.

(21) Appl. No.: 18/106,037

(22) Filed: Feb. 6, 2023

(65) Prior Publication Data

US 2023/0254909 A1 Aug. 10, 2023

Related U.S. Application Data

(60) Provisional application No. 63/307,656, filed on Feb. 8, 2022.

(51) Int. Cl.
*H04W 74/0833* (2024.01)
*H04W 74/0816* (2024.01)

(52) U.S. Cl.
CPC ..... *H04W 74/085* (2013.01); *H04W 74/0816* (2013.01)

(58) Field of Classification Search
CPC ........................ H04W 74/0816; H04W 74/085
See application file for complete search history.

(56) References Cited

U.S. PATENT DOCUMENTS

2021/0212118 A1* 7/2021 Lu ..................... H04W 74/0816
2021/0385692 A1* 12/2021 Kwon .................. H04W 28/24
(Continued)

FOREIGN PATENT DOCUMENTS

CN 113068214 A 7/2021
CN 113966643 A 1/2022
(Continued)

OTHER PUBLICATIONS

Taiwan Intellectual Property Office, Office Action in Taiwan Patent Application No. 112104251, Jul. 31, 2023.
(Continued)

*Primary Examiner* — Ayman A Abaza
*Assistant Examiner* — Hooman Houshmand
(74) *Attorney, Agent, or Firm* — Andy M. Han; Han IP PLLC

(57) ABSTRACT

A first multi-link device (MLD) determines that there is an overlap between reception of one or more frames from a second MLD on a first link of a plurality of enhanced multi-link single-radio (EMLSR) links and a frame exchange with the second MLD on a second link of the plurality of EMLSR links in an event that the frame exchange is started upon either: (i) expiration of a backoff timer regarding the second link or (ii) receiving a soliciting frame regarding the second link. In response to the determining, the first MLD refrains from either: (i) initiating the frame exchange on the second link upon the expiration of the backoff timer (e.g., by deferring the frame exchange to a later time) responsive to the expiration of the backoff timer regarding the second link or (ii) transmitting a solicited frame on the second link responsive to receiving the soliciting frame.

14 Claims, 7 Drawing Sheets

(56) References Cited

U.S. PATENT DOCUMENTS

| | | | | |
|---|---|---|---|---|
| 2022/0029736 | A1* | 1/2022 | Chu | H04L 1/0025 |
| 2023/0043667 | A1* | 2/2023 | Ghosh | H04L 5/0055 |
| 2024/0073952 | A1* | 2/2024 | Kim | H04W 74/0816 |
| 2024/0137979 | A1* | 4/2024 | Kim | H04L 69/28 |

FOREIGN PATENT DOCUMENTS

| | | | |
|---|---|---|---|
| WO | WO 2021172961 | A1 | 9/2021 |
| WO | WO 2021251758 | A1 | 12/2021 |

OTHER PUBLICATIONS

European Patent Office, Extended European Search Report in European Patent Application No. 23155261.3, Apr. 12, 2023.
Chinan National Intellectual Property Administration, First Office Action in China Application No. 202310096344.6, Jan. 4, 2026.
"35.Extremely high throughtput(EHT)MAC specification 35.1 Introduction", IEEE SA, IEEE Draft, p. 52-53, Jan. 27, 2022.

* cited by examiner

Figure 1:
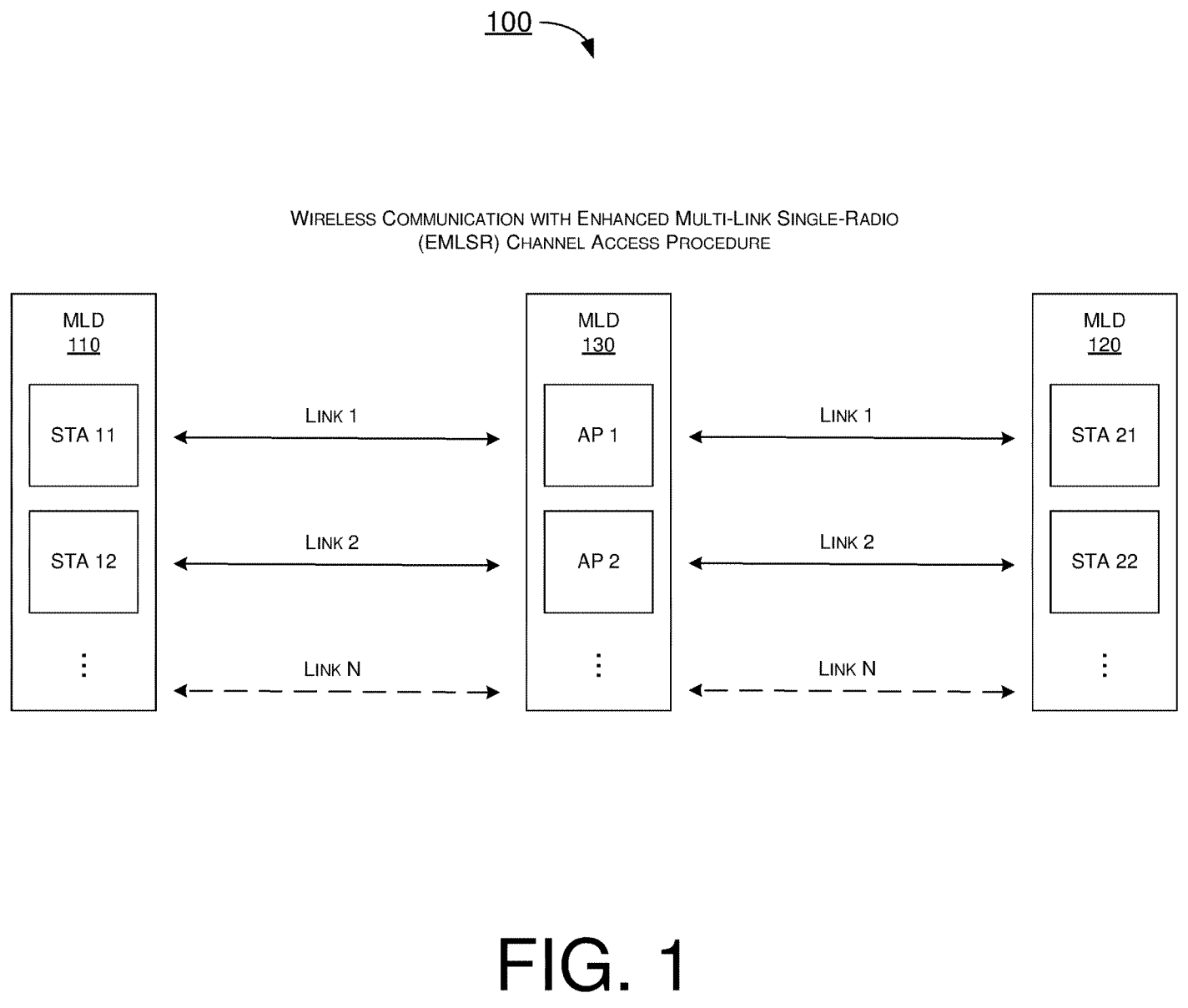

100

WIRELESS COMMUNICATION WITH ENHANCED MULTI-LINK SINGLE-RADIO (EMLSR) CHANNEL ACCESS PROCEDURE

MLD 110
STA 11
STA 12
...

LINK 1
LINK 2
LINK N

MLD 130
AP 1
AP 2
...

LINK 1
LINK 2
LINK N

MLD 120
STA 21
STA 22
...

Figure 6:
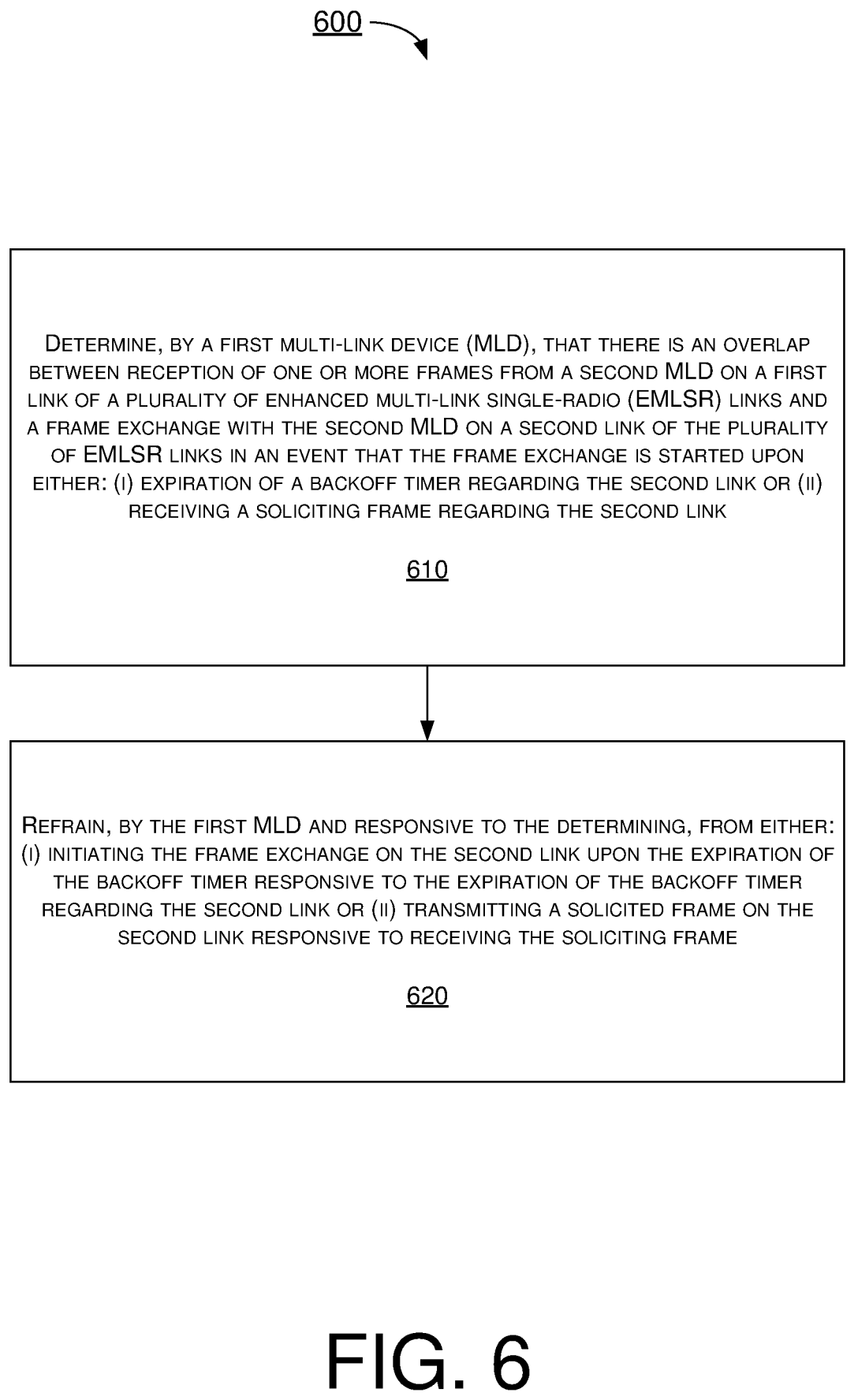

DETERMINE, BY A FIRST MULTI-LINK DEVICE (MLD), THAT THERE IS AN OVERLAP BETWEEN RECEPTION OF ONE OR MORE FRAMES FROM A SECOND MLD ON A FIRST LINK OF A PLURALITY OF ENHANCED MULTI-LINK SINGLE-RADIO (EMLSR) LINKS AND A FRAME EXCHANGE WITH THE SECOND MLD ON A SECOND LINK OF THE PLURALITY OF EMLSR LINKS IN AN EVENT THAT THE FRAME EXCHANGE IS STARTED UPON EITHER: (I) EXPIRATION OF A BACKOFF TIMER REGARDING THE SECOND LINK OR (II) RECEIVING A SOLICITING FRAME REGARDING THE SECOND LINK

610

REFRAIN, BY THE FIRST MLD AND RESPONSIVE TO THE DETERMINING, FROM EITHER: (I) INITIATING THE FRAME EXCHANGE ON THE SECOND LINK UPON THE EXPIRATION OF THE BACKOFF TIMER RESPONSIVE TO THE EXPIRATION OF THE BACKOFF TIMER REGARDING THE SECOND LINK OR (II) TRANSMITTING A SOLICITED FRAME ON THE SECOND LINK RESPONSIVE TO RECEIVING THE SOLICITING FRAME

Figure 7:
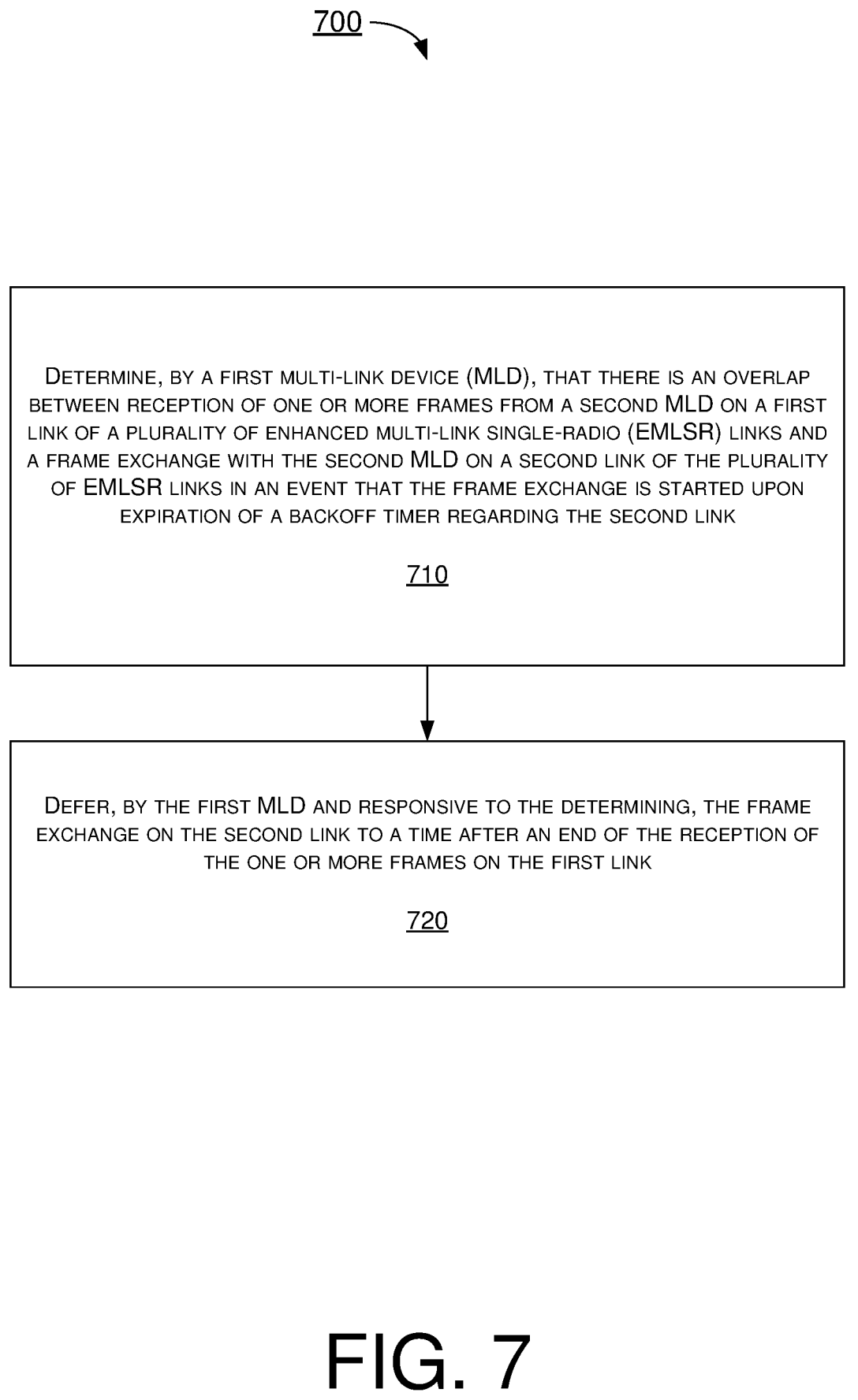

DETERMINE, BY A FIRST MULTI-LINK DEVICE (MLD), THAT THERE IS AN OVERLAP BETWEEN RECEPTION OF ONE OR MORE FRAMES FROM A SECOND MLD ON A FIRST LINK OF A PLURALITY OF ENHANCED MULTI-LINK SINGLE-RADIO (EMLSR) LINKS AND A FRAME EXCHANGE WITH THE SECOND MLD ON A SECOND LINK OF THE PLURALITY OF EMLSR LINKS IN AN EVENT THAT THE FRAME EXCHANGE IS STARTED UPON EXPIRATION OF A BACKOFF TIMER REGARDING THE SECOND LINK

710

DEFER, BY THE FIRST MLD AND RESPONSIVE TO THE DETERMINING, THE FRAME EXCHANGE ON THE SECOND LINK TO A TIME AFTER AN END OF THE RECEPTION OF THE ONE OR MORE FRAMES ON THE FIRST LINK

ENHANCED MULTI-LINK SINGLE-RADIO (EMLSR) CHANNEL ACCESS PROCEDURE IN WIRELESS COMMUNICATIONS

CROSS REFERENCE TO RELATED PATENT APPLICATION(S)

The present disclosure is part of a non-provisional patent application claiming the priority benefit of U.S. Provisional Patent Application No. 63/307,656, filed 8 Feb. 2022, the content of which being herein incorporated by reference in its entirety.

TECHNICAL FIELD

The present disclosure is generally related to wireless communications and, more particularly, to an enhanced multi-link single-radio (EMLSR) channel access procedure in wireless communications.

BACKGROUND

Unless otherwise indicated herein, approaches described in this section are not prior art to the claims listed below and are not admitted as prior art by inclusion in this section.

In a wireless local area network (WLAN) according to current Institute of Electrical and Electronics Engineers (IEEE) 802.11 specifications, only one station (STA) affiliated with a non-access point (non-AP) multi-link device (MLD) that is operating on one of one or more EMLSR links can initiate a frame exchange with an access point (AP) MLD. However, after receiving a group-addressed medium access control (MAC) protocol data unit (MPDU), one or more other STAs affiliated with the non-AP MLD that did not initiate the frame exchange could start transmissions without performing a backoff procedure. This may undesirably cause collision to happen. Therefore, there is a need for a solution of an EMLSR channel access procedure in wireless communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to an EMLSR channel access procedure in wireless communications. Under various proposed schemes in accordance with the present disclosure, issues described herein may be addressed.

In one aspect, a method may involve a first MLD determining that there is an overlap between reception of one or more frames from a second MLD on a first link of a plurality of EMLSR links and a frame exchange with the second MLD on a second link of the plurality of EMLSR links in an event that the frame exchange is started upon either: (i) expiration of a backoff timer regarding the second link or (ii) receiving a soliciting frame (e.g., a request-to-send (RTS) or trigger frame) regarding the second link. In response to the determining, the method may involve the first MLD refraining from either: (i) initiating the frame exchange on the second link upon the expiration of the backoff timer responsive to the expiration of the backoff timer regarding the second link or (ii) transmitting a solicited frame (e.g., a clear-to-send (CTS) frame or a trigger-based (TB) physical-layer protocol data unit (PPDU)) on the second link responsive to receiving the soliciting frame.

In another aspect, a method may involve a first MLD determining that there is an overlap between reception of one or more frames from a second MLD on a first link of a plurality of EMLSR links and a frame exchange with the second MLD on a second link of the plurality of EMLSR links in an event that the frame exchange is started upon expiration of a backoff timer regarding the second link. In response to the determining, the method may involve the first MLD deferring the frame exchange to a time after an end of the reception of the one or more frames on the first link.

In yet another aspect, an apparatus implementable in a first MLD may include a transceiver and a processor coupled to the transceiver. The transceiver may be configured to communicate wirelessly with a second MLD. The processor may be configured to determine that there is an overlap between reception of one or more frames from a second MLD on a first link of a plurality of EMLSR links and a frame exchange with the second MLD on a second link of the plurality of EMLSR links in an event that the frame exchange is started upon either: (i) expiration of a backoff timer regarding the second link or (ii) receiving a soliciting frame (e.g., an RTS or trigger frame) regarding the second link. In response to the determining, the processor may be configured to refrain from either: (i) initiating the frame exchange on the second link upon the expiration of the backoff timer responsive to the expiration of the backoff timer regarding the second link or (ii) transmitting a solicited frame (e.g., a CTS frame or a TB PPDU) on the second link responsive to receiving the soliciting frame.

In still another aspect, an apparatus implementable in a first MLD may include a transceiver and a processor coupled to the transceiver. The transceiver may be configured to communicate wirelessly with a second MLD. The processor may be configured to determine that there is an overlap between reception of one or more frames from a second MLD on a first link of a plurality of EMLSR links and a frame exchange with the second MLD on a second link of the plurality of EMLSR links in an event that the frame exchange is started upon expiration of a backoff timer regarding the second link. In response to the determining, the processor may be configured to defer the frame exchange to a time after an end of the reception of the one or more frames on the first link.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 1 is a diagram of an example network environment in which various solutions and schemes in accordance with the present disclosure may be implemented.

FIG. 6 is a flowchart of an example process illustrating overlap detection and transmission deferral under a proposed EMLSR channel access scheme in accordance with an implementation of the present disclosure.

FIG. 7 is a flowchart of an example process illustrating frame exchange deferral upon backoff-triggered overlap under a proposed EMLSR channel access scheme in accordance with an implementation of the present disclosure.

DETAILED DESCRIPTION OF PREFERRED EMBODIMENTS

Figure 2:
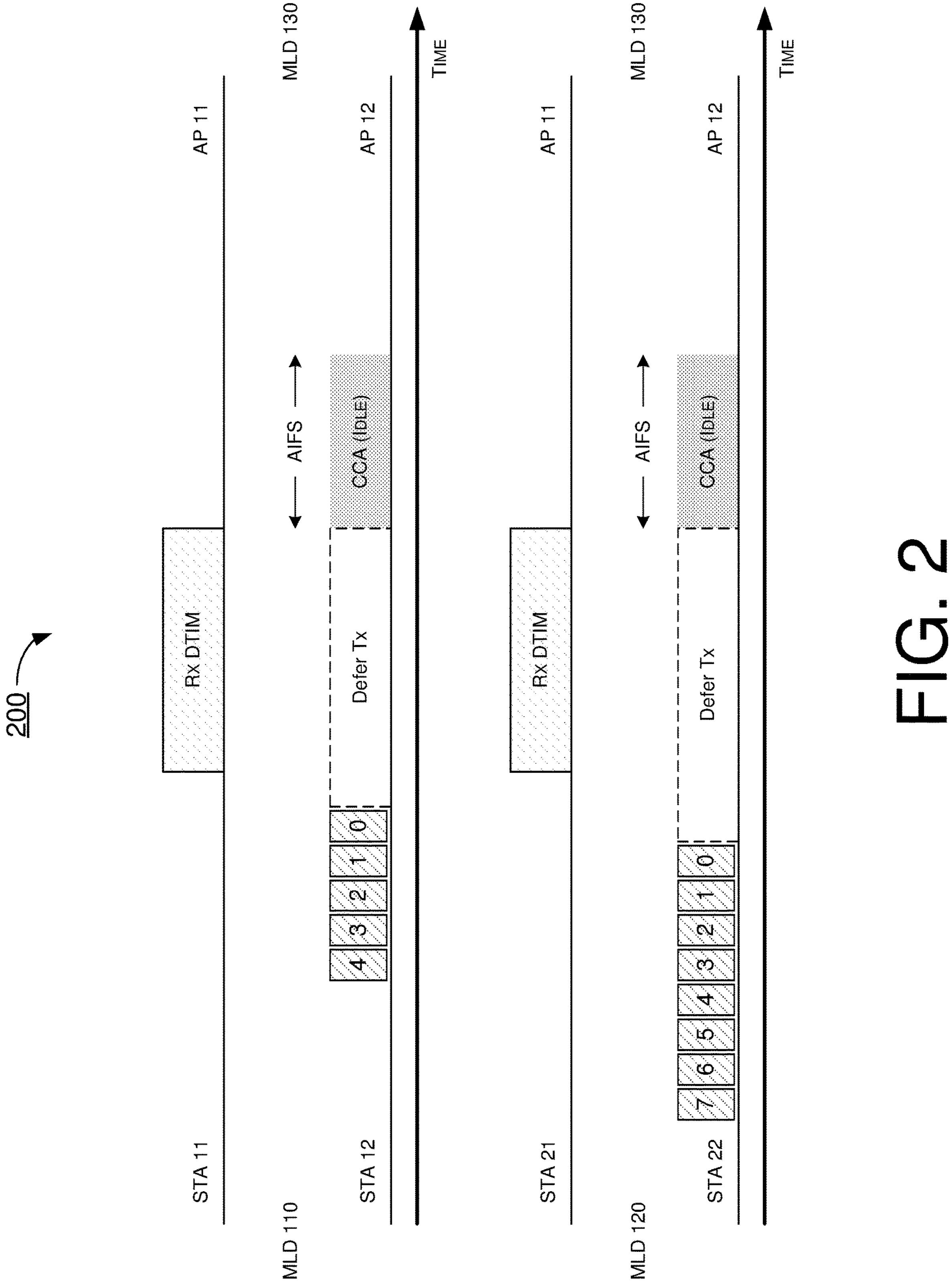
FIG. 2 is a diagram of an example scenario illustrating deferred transmission to avoid collision under a proposed EMLSR channel access scheme in accordance with an implementation of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to an EMLSR channel access procedure in wireless communications. According to the present disclosure, a number of possible solutions may be implemented separately or jointly. That is, although these possible solutions may be described below separately, two or more of these possible solutions may be implemented in one combination or another.

FIG. 1 illustrates an example network environment 100 in which various solutions and schemes in accordance with the present disclosure may be implemented. FIG. 2~FIG. 7 illustrate examples of implementation of various proposed schemes in network environment 100 in accordance with the present disclosure. The following description of various proposed schemes is provided with reference to FIG. 1~FIG. 7.

Referring to FIG. 1, network environment 100 may involve a first non-AP MLD (MLD 110) and a second non-AP MLD (MLD 120) communicating wirelessly over multiple links (e.g., link 1 and link 2) with an AP MLD (MLD 130) in accordance with one or more IEEE 802.11 standards. Each of MLD 110 and MLD 120 may function as a non-AP MLD with multiple virtual STAs affiliated therewith, and MLD 130 may function as an AP MLD with multiple virtual APs affiliated therewith. For illustrative purposes and without limiting the scope of the present disclosure, in FIG. 2~FIG. 4, MLD 110 is shown to be affiliated with a number of non-AP STAs (e.g., STA 11 and STA 12) and MLD 120 is shown to be affiliated with a number of non-AP STAs (e.g., STA 21 and STA 22). Correspondingly, in FIG. 2~FIG. 4, MLD 130 is shown to be affiliated with a number of AP STAs (e.g., AP 1 and AP 2). It is noteworthy that, although a certain number of STAs (e.g., two) is shown to be affiliated with each of MLD 110, MLD 120 and MLD 130, in actual implementations a number N of STAs affiliated with each of MLD 110, MLD 120 and MLD 130 and the number of corresponding links therebetween may be the same or different. Under various proposed schemes in accordance with the present disclosure, MLD 110, MLD 120 and MLD 130 may be configured to perform an EMLSR channel access procedure in wireless communications according to various proposed schemes described herein. It is noteworthy that the various proposed schemes may be implemented individually or, alternatively, jointly (e.g., two or more of the proposed schemes implemented together), even though each of the various proposed schemes may be separately described below.

Under current IEEE specification, with respect to an EMLSR procedure, a non-AP MLD (e.g., each of MLD 110 and MLD 120) may operate in the EMLSR mode on a specified set of one or more enabled links between the non-AP MLD and its associated AP MLD (e.g., MLD 130). The specified set of the one or more enabled links in which the EMLSR mode is applied may be referred to as EMLSR links. The EMLSR links may be indicated in an EMLSR Link Bitmap subfield of an enhanced multi-link (EML) Control field of an EML Operating Mode Notification frame by setting the bit positions of the EMLSR Link Bitmap subfield to 1. For the EMLSR mode enabled in a single-radio non-AP MLD (e.g., each of MLD 110 and MLD 120), the STA(s) affiliated with the non-AP MLD that operates on the link(s) corresponding to the bit position(s) of the EMLSR Link Bitmap subfield set to 0 may be in a doze state in case that a STA affiliated with the non-AP MLD operating on one of the EMLSR links is in an awake state. Moreover, an MLD with dot11EHTEMLSROptionImplemented equal to 'true' may set an EML Capabilities Present subfield to 1 and may also set an EMLSR Support subfield of a Common Info field of the Basic Multi-Link element to 1 in all Management frames that include the Basic Multi-Link element (except Authentication frames). On the one hand, an MLD with dot11EHTEMLSROptionImplemented equal to 'false' and dot11EHTEMLMROptionImplemented equal to 'true' may set the EML Capabilities Present subfield to 1 and may also set the EMLSR Support subfield of the EML Capabilities subfield to 0. On the other hand, an MLD with dot11EHTEMLSROptionImplemented equal to 'false' and dot11EHTEMLMROptionImplemented equal to 'false' may set the EML Capabilities Present subfield to 0.

With respect to carrying out the EMLSR procedure, when a non-AP MLD (e.g., each of MLD 110 and MLD 120) with dot11EHTEMLSROptionImplemented equal to 'true' intends to operate in the EMLSR mode on the EMLSR links, a STA affiliated with the non-AP MLD may transmit an EML Operating Mode Notification frame, with the EMLSR Mode subfield of the EML Control field of the frame set to 1, to an AP affiliated with an AP MLD (e.g., MLD 130) with dot11EHTEMLSROptionImplemented equal to 'true'. Additionally, an AP affiliated with the AP MLD that received the EML Operating Mode Notification frame from the STA affiliated with the non-AP MLD may transmit an EML Operating Mode Notification frame to one of the STAs affiliated with the non-AP MLD within a timeout interval indicated in the Transition Timeout subfield in the EML Capabilities subfield of the Basic Multi-Link element, starting at the end of a physical-layer protocol data unit (PPDU) transmitted by the AP affiliated with the AP MLD, as an acknowledgement to the EML Operating Mode Notification frame transmitted by the STA affiliated with the non-AP MLD. After a successful transmission of the EML Operating Mode Notification frame on one of the EMLSR links by the STA affiliated with the non-AP MLD, the non-AP MLD may operate in the EMLSR mode and the STAs on the other links of the EMLSR links may transition to an active mode after a transition delay indicated in the Transition Timeout subfield in the EML Capabilities subfield of the Basic Multi-Link element or, alternatively, immediately after receiving an EML Operating Mode Notification frame from one of the APs operating on the EMLSR links and affiliated with the AP MLD. Moreover, a STA on one of the other links of the EMLSR links may not transmit a frame with a Power Management subfield set to 1 before receiving the EML Operating Mode Notification frame from the AP affiliated with the AP MLD or before the end of the timeout interval.

With respect to disabling or existing the EMLSR procedure, when a non-AP MLD (e.g., each of MLD 110 and MLD 120) with dot11EHTEMLSROptionImplemented equal to 'true' intends to disable the EMLSR mode, a STA affiliated with the non-AP MLD may transmit an EML Operating Mode Notification frame, with the EMLSR Mode subfield of the EML Control field of the frame set to 0, to an AP affiliated with an AP MLD (e.g., MLD 130) with dot11EHTEMLSROptionImplemented equal to 'true'. Correspondingly, an AP affiliated with the AP MLD that received the EML Operating Mode Notification frame from the STA affiliated with the non-AP MLD may transmit an EML Operating Mode Notification frame to one of the STAs affiliated with the non-AP MLD within a timeout interval indicated in the Transition Timeout subfield in the EML Capabilities subfield of the Basic Multi-Link element, starting at the end of the PPDU transmitted by the AP affiliated with the AP MLD, as an acknowledgement to the EML Operating Mode Notification frame transmitted by the STA affiliated with the non-AP MLD. After a successful transmission of the EML Operating Mode Notification frame on one of the EMLSR links by the STA affiliated with the non-AP MLD, the non-AP MLD may disable the EMLSR mode and the STAs on the other links of the EMLSR links may transition to a power-save mode after a transition delay indicated in the Transition Timeout subfield in the EML Capabilities subfield of the Basic Multi-Link element or immediately after receiving an EML Operating Mode Notification frame from one of the APs operating on the EMLSR links and affiliated with the AP MLD. Furthermore, a STA on one of the other links of the EMLSR links may not transmit a frame with the Power Management subfield set to 0 before receiving the EML Operating Mode Notification frame from the AP affiliated with the AP MLD or before the end of the timeout interval.

When a non-AP MLD (e.g., each of MLD 110 and MLD 120) is operating in the EMLSR mode with an AP MLD (e.g., MLD 130) supporting the EMLSR mode, certain conditions may apply, as described below. For instance, the non-AP MLD may be able to listen on the EMLSR links, by having its affiliated STA(s) corresponding to those links in an awake state. The listening operation may include clear channel assessment (CCA) and receiving an initial Control frame of frame exchanges that is initiated by the AP MLD. Additionally, the initial Control frame of frame exchanges may be sent in an orthogonal frequency-division multiplexing (OFDM) PPDU or non-high-throughput (non-HT) duplicate PPDU format using a rate of 6 Mbps, 12 Mbps, or 24 Mbps. Also, the initial Control frame may be a multi-user request-to-send (MU-RTS) Trigger frame or a Buffer Status Report Poll (BSRP) Trigger frame, and reception of MU-RTS and BSRP Trigger frames may be mandatory for a non-AP MLD that is in the EMLSR mode. The number of spatial streams for a response to the BSRP Trigger frame may be limited to one. Moreover, the non-AP MLD may indicate a delay time duration in an EMLSR Padding Delay subfield of the EML Capabilities subfield in the Common Info field of the Basic Multi-Link element. Furthermore, an AP affiliated with the AP MLD that initiates frame exchanges with the non-AP MLD on one of the EMLSR links may begin the frame exchanges by transmitting the initial Control frame to the non-AP MLD with the limitations specified above. After receiving the initial Control frame of frame exchanges, a STA affiliated with the non-AP MLD that was listening on the corresponding link may transmit or receive frames on the link on which the initial Control frame was received but may not transmit or receive on the other EMLSR link(s) until the end of the frame exchanges. Subject to its spatial stream capabilities, operation mode, and link switch delay, the STA affiliated with the non-AP MLD may be capable of receiving a PPDU that is sent using more than one spatial stream on the link on which the initial Control frame was received a short inter-frame space (SIFS) after the end of its response frame transmission solicited by the initial Control frame. During the frame exchanges, the other AP(s) affiliated with the AP MLD may not transmit frames to the other STA(s) affiliated with the non-AP MLD on the other EMLSR link(s).

The non-AP MLD may be switched back to the listening operation on the EMLSR links after the time indicated in the EMLSR Transition Delay subfield of the EML Capabilities subfield in the Common Info field of the Basic Multi-Link element in case that any of certain conditions described below is met and this may be defined as the end of the frame exchanges. For instance, a medium access control (MAC) layer of the STA affiliated with the non-AP MLD that received the initial Control frame does not receive a PHY-RXSTART.indication primitive during a timeout interval of aSIFSTime+aSlotTime+aRxPHYStartDelay starting at the end of a PPDU transmitted by the STA of the non-AP MLD as a response to a most recently received frame from the AP affiliated with the AP MLD or, alternatively, starting at the end of the reception of a PPDU containing a frame for the STA from the AP affiliated with the AP MLD that does not require immediate acknowledgement. Additionally, the MAC layer of the STA affiliated with the non-AP MLD that received the initial Control frame receives a PHY- RXSTART.indication primitive during a timeout interval of aSIFSTime+aSlotTime+aRxPHYStartDelay starting at the end of a PPDU transmitted by the STA of the non-AP MLD as a response to the most recently received frame from the AP affiliated with the AP MLD or, alternatively, starting at the end of the reception of the PPDU containing a frame for the STA from the AP affiliated with the AP MLD that does not require immediate acknowledgement and the STA affiliated with the non-AP MLD does not detect, within the PPDU corresponding to the PHY-RXSTART.indication any of the following frames: (a) an individually addressed frame with the RA equal to the MAC address of the STA affiliated with the non-AP MLD, (b) a Trigger frame that has one of the User Info fields addressed to the STA affiliated with the non-AP MLD, (c) a CTS-to-self frame with the RA equal to the MAC address of the AP affiliated with the AP MLD, (d) a Multi-STA Block Acknowledgement (BlockAck) frame that has one of the Per Association Identifier (AID) traffic identifier (TID) Info fields addressed to the STA affiliated with the non-AP MLD, and (e) a Neighbor Discovery Protocol (NDP) Announcement frame that has one of the STA Info fields addressed to the STA affiliated with the non-AP MLD. Lastly, the STA affiliated with the non-AP MLD that received the initial Control frame does not respond to the most recently received frame from the AP affiliated with the AP MLD that requires immediate response after a SIFS.

There may be other conditions that apply when a non-AP MLD (e.g., MLD 110) is operating in the EMLSR mode with an AP MLD (e.g., MLD 120) supporting the EMLSR mode, as described below. For instance, the AP affiliated with the AP MLD may transmit, before a transmission network allocation vector (TXNAV) timer expires, another initial Control frame addressed to the STA affiliated with the non-AP MLD in case that the AP intends to continue the frame exchanges with the STA and did not receive the response frame from this STA for the most recently transmitted frame that requires an immediate response after a SIFS. When a STA of the non-AP MLD initiates a transmission opportunity (TXOP), the non-AP MLD may switch back to the listening operation on the EMLSR links after the time duration indicated in the EMLSR Transition Delay subfield after the end of the TXOP. Moreover, only one STA affiliated with the non-AP MLD that is operating on one of the EMLSR links may initiate frame exchanges with the AP MLD.

FIG. 2 illustrates an example scenario 200 of an EMLSR channel access procedure under a proposed scheme in accordance with the present disclosure. In scenario 200, STA 11 and STA 12 affiliated with MLD 110 may be operating on link 1 and link 2, which may be EMLSR links, and in communication with respective APs affiliated with MLD 130. Moreover, STA 21 and STA 22 affiliated with MLD 120 may also be operating on link 1 and link 2 and in communication with respective APs affiliated with MLD 130. Under the proposed scheme, in an event that a backoff timer of a STA affiliated with the non-AP MLD is expired on one of the EMLSR links while a frame exchange overlaps in time with the reception of one or more group-addressed MPDUs (e.g., beacon frame(s) including delivery traffic indication message(s) (DTIMs)) in another link of the EMLSR links, then the STA affiliated with the non-AP MLD may not initiate the frame exchange with an AP MLD (e.g., by deferring transmission).

Referring to FIG. 2, when a backoff timer of STA 12 on link 2 expires (e.g., its backoff timer counting down to 0), a would-be frame exchange between STA 12 and a respective AP affiliated with MLD 130 (e.g., AP 2) on link 2 may be deferred and not initiated by STA 12. Ideally, this may avoid collision with the reception of group-addressed MPDU(s) (e.g., beacon frame(s) with DTIM) by STA 11 from a respective AP affiliated with MLD 130 (e.g., AP 1) on link 1 during a period of time that overlaps with the would-be frame exchange between STA 12 and AP 2. Likewise, when a backoff timer of STA 22 on link 2 expires (e.g., its backoff timer counting down to 0), a would-be frame exchange between STA 22 and a respective AP affiliated with MLD 130 (e.g., AP 2) on link 2 may be deferred and not initiated by STA 22. Ideally, this may avoid collision with the reception of group-addressed MPDU(s) (e.g., beacon frame(s) with DTIM) by STA 21 from a respective AP affiliated with MLD 130 (e.g., AP 1) on link 1 during a period of time that overlaps with the would-be frame exchange between STA 22 and AP 2.

Figure 3:
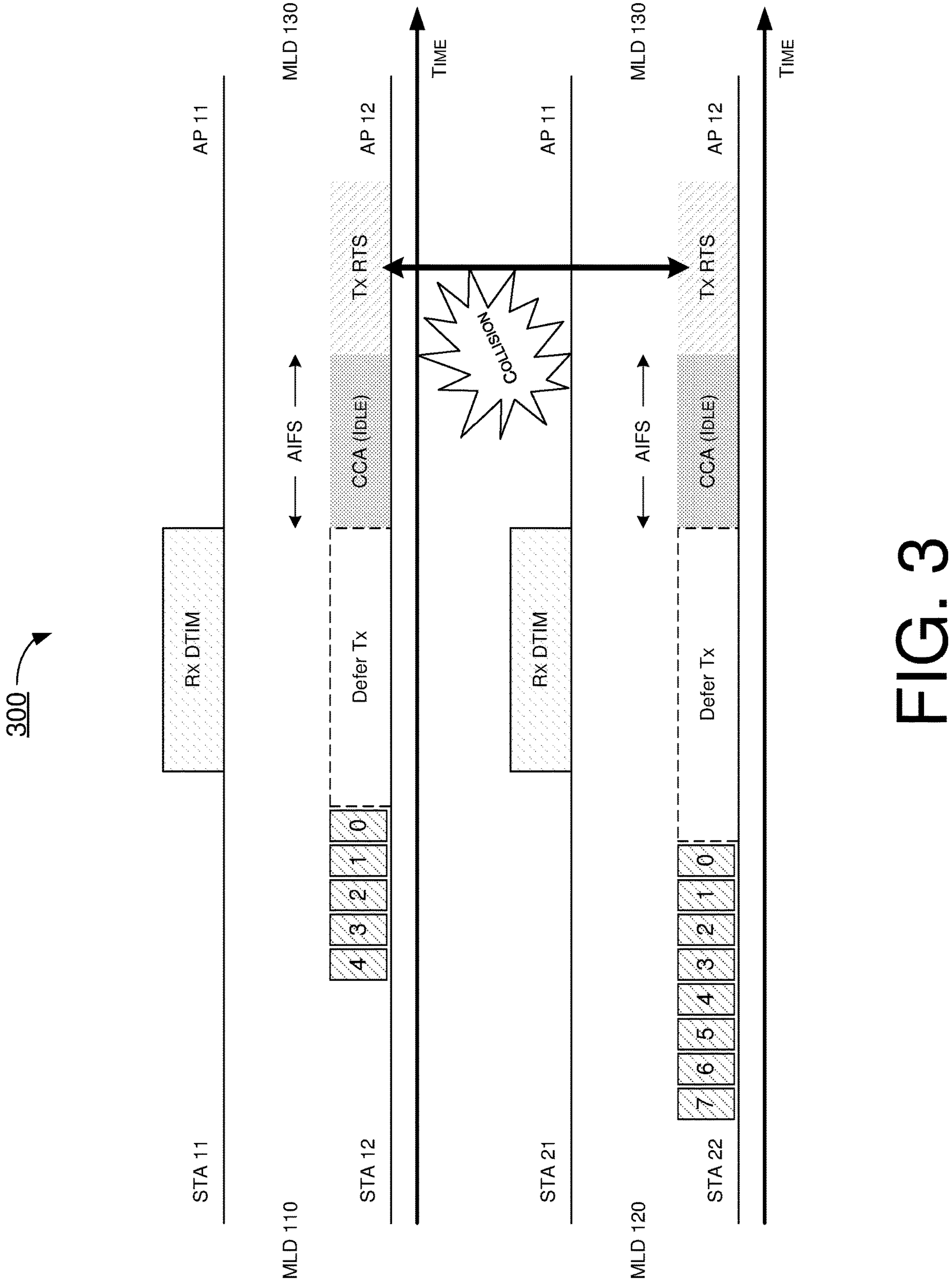
FIG. 3 is a diagram of an example scenario illustrating potential collision without a proposed EMLSR channel access scheme in accordance with an implementation of the present disclosure.

FIG. 3 illustrates an example scenario 300 of an EMLSR channel access procedure without implementing any of the proposed schemes in accordance with the present disclosure. Scenario 300 may be a hypothetical continuation of scenario 200. In scenario 300, after receiving group-addressed MPDU(s), collision may occur in case that STAs affiliated with non-AP MLDs that did not initiate frame exchanges start frame transmissions without performing another backoff procedure.

Referring to FIG. 3, after receiving the group-addressed MPDU(s), in case that each of STA 12 and STA 22, which did not initiate frame exchanges with AP 2, respectively, simultaneously start frame transmissions on link 2 without performing another backoff procedure (albeit after determining the channel (or link 2) to be idle based on CCA of a duration of an arbitration inter-frame spacing (AIFS)), collision between the transmissions of STA 12 and STA 22 (e.g., an RTS frame) on link 2 may occur. This is undesirable and is to be avoided.

Figure 4:
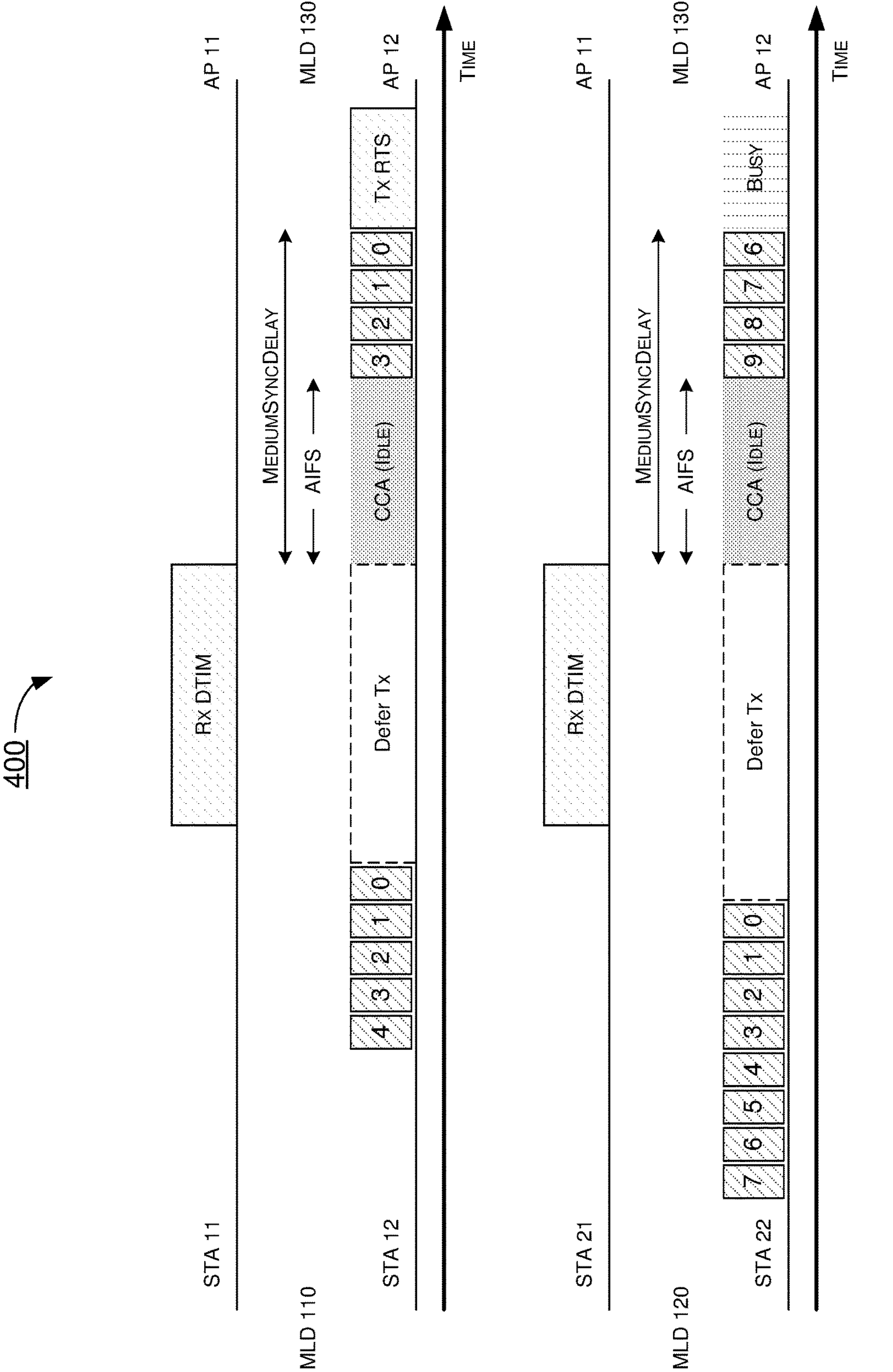
FIG. 4 is a diagram of an example scenario illustrating invocation of a backoff procedure to avoid collision under a proposed EMLSR channel access scheme in accordance with an implementation of the present disclosure.

FIG. 4 illustrates an example scenario 400 of an EMLSR channel access procedure under a proposed scheme in accordance with the present disclosure. In scenario 400, when a non-AP MLD switches back to a listening operation on the EMLSR links, a STA affiliated with the non-AP MLD may invoke a new backoff procedure in an event that a backoff counter of that STA has a value of 0 (e.g., due to having expired from a previous countdown).

Referring to FIG. 4, after the initial backoff procedure counts down to 0, each of MLD 110 and MLD 120 may switch back to a listening operation on link 2. Moreover, as the backoff timer has a value of 0, each of STA 12 and STA 22 may invoke a new backoff procedure on link 2 (e.g., after detecting link 2 to be idle by CCA) before performing any transmission on link 2. Ideally, this may avoid simultaneously transmissions by STA 12 and STA 22 on link 2, thereby avoiding a collision.

Illustrative Implementations

Figure 5:
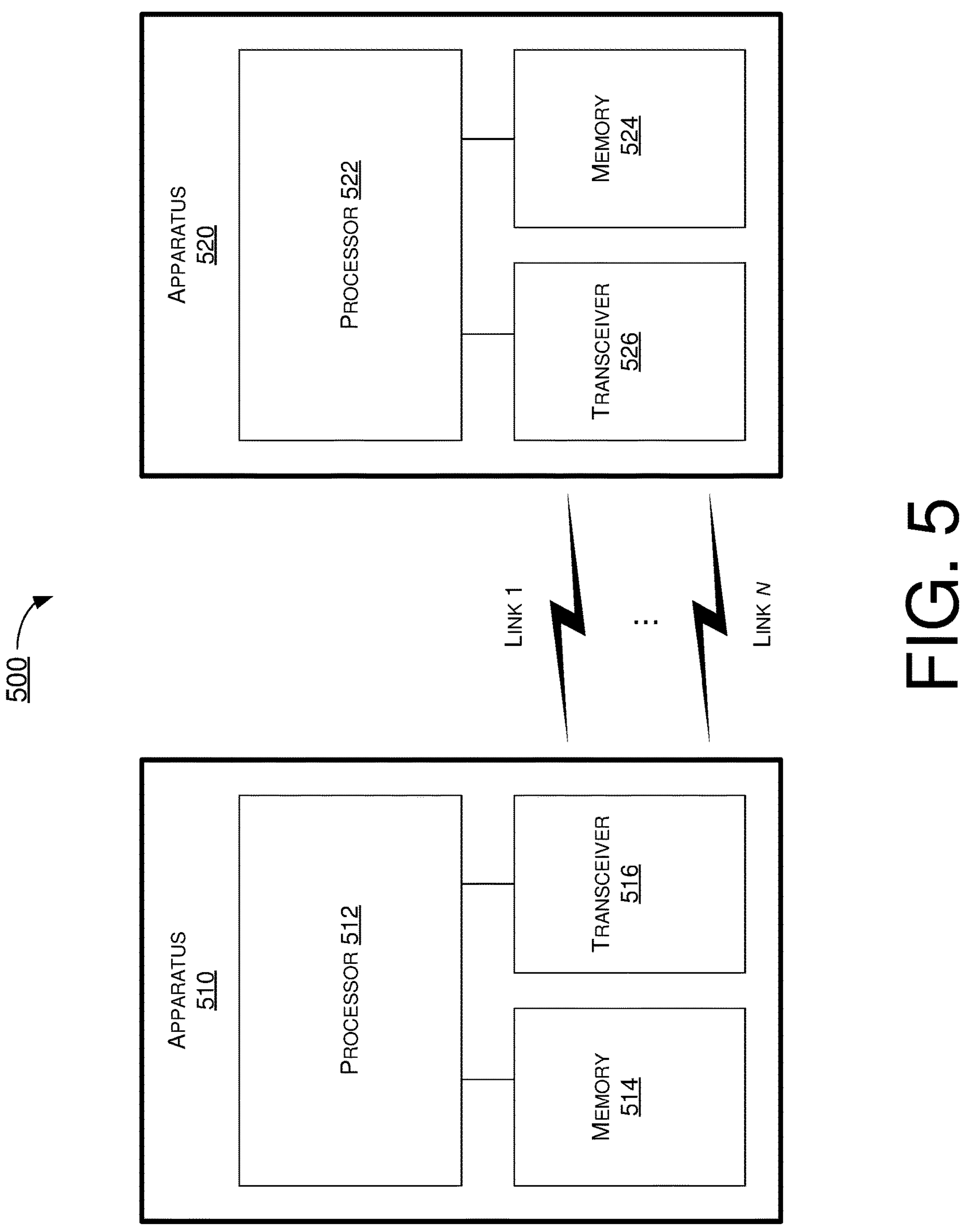
FIG. 5 is a block diagram of an example communication system in accordance with an implementation of the present disclosure.

FIG. 5 illustrates an example system 500 having at least an example apparatus 510 and an example apparatus 520 in accordance with an implementation of the present disclosure. Each of apparatus 510 and apparatus 520 may perform various functions to implement schemes, techniques, processes and methods described herein pertaining to an EMLSR channel access procedure in wireless communications, including the various schemes described above with respect to various proposed designs, concepts, schemes, systems and methods described above as well as processes described below. For instance, apparatus 510 may be an example implementation of MLD 110 or MLD 120, and apparatus 520 may be an example implementation of MLD 130.

Each of apparatus 510 and apparatus 520 may be a part of an electronic apparatus such as, for example and without limitation, a portable or mobile apparatus, a wearable apparatus, a wireless communication apparatus or a computing apparatus. For instance, each of apparatus 510 and apparatus 520 may be implemented in a smartphone, a smart watch, a personal digital assistant, a digital camera, or a computing equipment such as a tablet computer, a laptop computer or a notebook computer. Each of apparatus 510 and apparatus 520 may also be a part of a machine type apparatus, which may be an IoT apparatus such as an immobile or a stationary apparatus, a home apparatus, a wire communication apparatus or a computing apparatus. For instance, each of apparatus 510 and apparatus 520 may be implemented in a smart thermostat, a smart fridge, a smart door lock, a wireless speaker or a home control center. When implemented in or as a network apparatus, apparatus 510 and/or apparatus 520 may be implemented in a network node, such as an AP in a WLAN.

In some implementations, each of apparatus 510 and apparatus 520 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Each of apparatus 510 and apparatus 520 may include at least some of those components shown in FIG. 5 such as a processor 512 and a processor 522, respectively, for example. Each of apparatus 510 and apparatus 520 may further include one or more other components not pertinent to the proposed scheme of the present disclosure (e.g., internal power supply, display device and/or user interface device), and, thus, such component(s) of apparatus 510 and apparatus 520 are neither shown in FIG. 5 nor described below in the interest of simplicity and brevity.

In one aspect, each of processor 512 and processor 522 may be implemented in the form of one or more single-core processors, one or more multi-core processors, one or more RISC processors or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including those pertaining to an EMLSR channel access procedure in wireless communications in accordance with various implementations of the present disclosure.

In some implementations, apparatus 510 may also include a transceiver 516 coupled to processor 512. Transceiver 516 may be capable of wirelessly transmitting and receiving data. In some implementations, apparatus 520 may also include a transceiver 526 coupled to processor 522. Transceiver 526 may include a transceiver capable of wirelessly transmitting and receiving data. Transceiver 516 of apparatus 510 and transceiver 526 of apparatus 520 may communicate each other over one or more of multiple links link 1~link N, with N being a positive integer greater than 1, such as a first link and a second link.

In some implementations, apparatus 510 may further include a memory 514 coupled to processor 512 and capable of being accessed by processor 512 and storing data therein. In some implementations, apparatus 520 may further include a memory 524 coupled to processor 522 and capable of being accessed by processor 522 and storing data therein. Each of memory 514 and memory 524 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 514 and memory 524 may include a type of read-only memory (ROM) such as mask ROM, programmable ROM (PROM), erasable programmable ROM (EPROM) and/or electrically erasable programmable ROM (EEPROM). Alternatively, or additionally, each of memory 514 and memory 524 may include a type of non-volatile random-access memory (NVRAM) such as flash memory, solid-state memory, ferroelectric RAM (FeRAM), magnetoresistive RAM (MRAM) and/or phase-change memory.

Each of apparatus 510 and apparatus 520 may be a communication entity capable of communicating with each other using various proposed schemes in accordance with the present disclosure. For illustrative purposes and without limitation, a description of capabilities of apparatus 510, as MLD 110 or MLD 120 which may be a non-AP MLD, and apparatus 520, as MLD 130 which may be an AP MLD, is provided below. It is noteworthy that, although the example implementations described below are provided in the context of WLAN, the same may be implemented in other types of networks.

Under a proposed scheme with respect to an EMLSR channel access procedure in wireless communications in accordance with the present disclosure, processor 512 of apparatus 510, as a first MLD (e.g., MLD 110 or MLD 120), may determine that there is an overlap between reception of one or more frames from a second MLD (e.g., apparatus 520) on a first link of a plurality of EMLSR links and a frame exchange with the second MLD on a second link of the plurality of EMLSR links in an event that the frame exchange is started upon either: (i) expiration of a backoff timer regarding the second link or (ii) receiving a soliciting frame (e.g., an RTS or trigger frame) regarding the second link. Furthermore, in response to the determining, processor 512 may refrain from either: (i) initiating the frame exchange on the second link upon the expiration of the backoff timer responsive to the expiration of the backoff timer regarding the second link or (ii) transmitting a solicited frame (e.g., a CTS frame or a TB PPDU) on the second link responsive to receiving the soliciting frame.

In some implementations, in refraining from initiating the frame exchange, processor 512 may defer the frame exchange to a time after an end of the reception of the one or more frames on the first link.

In some implementations, in deferring the frame exchange, processor 512 may initiate the frame exchange after a CCA on the second link, which is conducted after the end of the reception of the one or more frames on the first link, indicates the second link as clear for transmission. For instance, processor 512 may conduct a CCA on the second link after an end of the reception of the one or more frames on the first link. Additionally, processor 512 may invoke at least one backoff procedure on the second link upon the CCA indicates the second link as clear for transmission. Moreover, processor 512 may initiate the frame exchange on the second link upon expiration of the at least one backoff procedure.

In some implementations, the reception of one or more frames may involve reception of one or more group-addressed MPDUs.

In some implementations, the reception of one or more frames may involve reception of one or more beacon frames each comprising a DTIM.

In some implementations, the frame exchange may involve transmission of a RTS frame.

Under another proposed scheme with respect to an EMLSR channel access procedure in wireless communications in accordance with the present disclosure, processor 512 of apparatus 510, as a first MLD (e.g., MLD 110 or MLD 120), may determine that there is an overlap between reception of one or more frames from a second MLD (e.g., apparatus 520) on a first link of a plurality of EMLSR links and a frame exchange with the second MLD on a second link of the plurality of EMLSR links in an event that the frame exchange is started upon expiration of a backoff timer regarding the second link. Furthermore, in response to the determining, processor 512 may defer the frame exchange on the second link to a time after an end of the reception of the one or more frames on the first link.

In some implementations, in deferring the frame exchange, processor 512 may initiate the frame exchange after a CCA on the second link, which is conducted after the end of the reception of the one or more frames on the first link, indicates the second link as clear for transmission. For instance, processor 512 may conduct a CCA on the second link after an end of the reception of the one or more frames on the first link. Additionally, processor 512 may invoke at least one backoff procedure on the second link upon the CCA indicates the second link as clear for transmission. Moreover, processor 512 may initiate the frame exchange on the second link upon expiration of the at least one backoff procedure.

In some implementations, the reception of one or more frames may involve reception of one or more group-addressed MPDUs.

In some implementations, the reception of one or more frames may involve reception of one or more beacon frames each comprising a DTIM.

In some implementations, the frame exchange may involve transmission of a RTS frame.

Illustrative Processes

FIG. 6 illustrates an example process 600 in accordance with an implementation of the present disclosure. Process 600 may represent an aspect of implementing various proposed designs, concepts, schemes, systems and methods described above. More specifically, process 600 may represent an aspect of the proposed concepts and schemes pertaining to an EMLSR channel access procedure in wireless communications in accordance with the present disclosure. Process 600 may include one or more operations, actions, or functions as illustrated by one or more of blocks 610 and 620. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively in a different order. Furthermore, one or more of the blocks/sub-blocks of process 600 may be executed repeatedly or iteratively. Process 600 may be implemented by or in apparatus 510 and apparatus 520 as well as any variations thereof. Solely for illustrative purposes and without limiting the scope, process 600 is described below in the context of apparatus 510 as MLD 110 or MLD 120 (e.g., a non-AP MLD) and apparatus 520 as MLD 130 (e.g., a peer STA MLD or AP MLD) of a wireless network such as a WLAN in accordance with one or more of IEEE 802.11 standards. Process 600 may begin at block 610.

At 610, process 600 may involve processor 512 of apparatus 510, as a first MLD (e.g., MLD 110 or MLD 120), determining that there is an overlap between reception of one or more frames from a second MLD (e.g., apparatus 520) on a first link of a plurality of EMLSR links and a frame exchange with the second MLD on a second link of the plurality of EMLSR links in an event that the frame exchange is started upon either: (i) expiration of a backoff timer regarding the second link or (ii) receiving a soliciting frame (e.g., an RTS or trigger frame) regarding the second link. Process 600 may proceed from 610 to 620.

At 620, process 600 may involve processor 512, in response to the determining, refraining from either: (i) initiating the frame exchange on the second link upon the expiration of the backoff timer responsive to the expiration of the backoff timer regarding the second link or (ii) transmitting a solicited frame (e.g., a CTS frame or a TB PPDU) on the second link responsive to receiving the soliciting frame.

In some implementations, in refraining from initiating the frame exchange, process 600 may involve processor 512 deferring the frame exchange to a time after an end of the reception of the one or more frames on the first link.

In some implementations, in deferring the frame exchange, process 600 may involve processor 512 initiating the frame exchange after a CCA on the second link, which is conducted after the end of the reception of the one or more frames on the first link, indicates the second link as clear for transmission. For instance, process 600 may involve processor 512 conducting a CCA on the second link after an end of the reception of the one or more frames on the first link. Additionally, process 600 may involve processor 512 invoking at least one backoff procedure on the second link upon the CCA indicates the second link as clear for transmission. Moreover, process 600 may involve processor 512 initiating the frame exchange on the second link upon expiration of the at least one backoff procedure.

In some implementations, the reception of one or more frames may involve reception of one or more group-addressed MPDUs.

In some implementations, the reception of one or more frames may involve reception of one or more beacon frames each comprising a DTIM.

In some implementations, the frame exchange may involve transmission of a RTS frame.

FIG. 7 illustrates an example process 700 in accordance with an implementation of the present disclosure. Process 700 may represent an aspect of implementing various proposed designs, concepts, schemes, systems and methods described above. More specifically, process 700 may represent an aspect of the proposed concepts and schemes pertaining to an EMLSR channel access procedure in wireless communications in accordance with the present disclosure. Process 700 may include one or more operations, actions, or functions as illustrated by one or more of blocks 710 and 720. Although illustrated as discrete blocks, various blocks of process 700 may be divided into additional blocks, combined into fewer blocks, or eliminated, depending on the desired implementation. Moreover, the blocks/sub-blocks of process 700 may be executed in the order shown in FIG. 7 or, alternatively in a different order. Furthermore, one or more of the blocks/sub-blocks of process 700 may be executed repeatedly or iteratively. Process 700 may be implemented by or in apparatus 510 and apparatus 520 as well as any variations thereof. Solely for illustrative purposes and without limiting the scope, process 700 is described below in the context of apparatus 510 as MLD 110 or MLD 120 (e.g., a non-AP MLD) and apparatus 520 as MLD 130 (e.g., a peer STA MLD or AP MLD) of a wireless network such as a WLAN in accordance with one or more of IEEE 802.11 standards. Process 700 may begin at block 710.

At 710, process 700 may involve processor 512 of apparatus 510, as a first MLD (e.g., MLD 110 or MLD 120), determining that there is an overlap between reception of one or more frames from a second MLD (e.g., apparatus 520) on a first link of a plurality of EMLSR links and a frame exchange with the second MLD on a second link of the plurality of EMLSR links in an event that the frame exchange is started upon expiration of a backoff timer regarding the second link. Process 700 may proceed from 710 to 720.

At 720, process 700 may involve processor 512, in response to the determining, deferring the frame exchange on the second link to a time after an end of the reception of the one or more frames on the first link.

In some implementations, in deferring the frame exchange, process 700 may involve processor 512 initiating the frame exchange after a CCA on the second link, which is conducted after the end of the reception of the one or more frames on the first link, indicates the second link as clear for transmission. For instance, process 700 may involve processor 512 conducting a CCA on the second link after an end of the reception of the one or more frames on the first link. Additionally, process 700 may involve processor 512 invoking at least one backoff procedure on the second link upon the CCA indicates the second link as clear for transmission. Moreover, process 700 may involve processor 512 initiating the frame exchange on the second link upon expiration of the at least one backoff procedure.

In some implementations, the reception of one or more frames may involve reception of one or more group-addressed MPDUs.

In some implementations, the reception of one or more frames may involve reception of one or more beacon frames each comprising a DTIM.

In some implementations, the frame exchange may involve transmission of a RTS frame.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds 'true' for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the 'true' scope and spirit being indicated by the following claims.

What is claimed is:

1. A method, comprising:

determining, by a first multi-link device (MLD), wherein the first MLD is a non-access point (non-AP) MLD, wherein a second MLD is an access point (AP) MLD, and wherein the first MLD and the second MLD communicate wirelessly over a plurality of enhanced multi-link single-radio (EMLSR) links, that there is an overlap between reception, by the first MLD, of one or more frames from the second MLD on a first link of the plurality of EMLSR links between the first MLD and the second MLD and a frame exchange between the first MLD and the second MLD on a second link of the plurality of EMLSR links between the first MLD and the second MLD in an event that the frame exchange is started upon either:

expiration of a backoff timer regarding the second link, or receiving, by the first MLD, a soliciting frame from the second MLD regarding the second link; and refraining, by the first MLD and responsive to the determining, from either:

initiating the frame exchange on the second link upon the expiration of the backoff timer responsive to the expiration of the backoff timer regarding the second link, or transmitting a solicited frame on the second link responsive to receiving the soliciting frame, wherein the refraining from initiating the frame exchange comprises deferring the frame exchange to a time after an end of the reception of the one or more frames on the first link, and wherein the deferring of the frame exchange comprises:

conducting a clear channel assessment (CCA) on the second link after an end of the reception of the one or more frames on the first link;

invoking at least one backoff procedure on the second link upon the CCA indicates the second link as clear for transmission; and initiating the frame exchange on the second link upon expiration of the at least one backoff procedure.

2. The method of claim 1, wherein the deferring of the frame exchange comprises initiating the frame exchange after a clear channel assessment (CCA) on the second link, which is conducted after the end of the reception of the one or more frames on the first link, indicates the second link as clear for transmission.

3. The method of claim 1, wherein the reception of one or more frames comprises reception of one or more group-addressed medium access control (MAC) protocol data units (MPDUs).

4. The method of claim 1, wherein the reception of one or more frames comprises reception of one or more beacon frames each comprising a delivery traffic indication message (DTIM).

5. The method of claim 1, wherein the soliciting frame comprises a request-to-send (RTS) frame or a trigger frame, and wherein the solicited frame comprises a clear-to-send (CTS) frame or a trigger-based (TB) physical-layer protocol data unit (PPDU).

6. A method, comprising:

determining, by a first multi-link device (MLD), wherein the first MLD is a non-access point (non-AP) MLD, wherein a second MLD is an access point (AP) MLD, and wherein the first MLD and the second MLD communicate wirelessly over a plurality of enhanced multi-link single-radio (EMLSR) links, that there is an overlap between reception, by the first MLD, of one or more frames from the second MLD on a first link of the plurality of EMLSR links between the first MLD and the second MLD and a frame exchange between the first MLD and the second MLD on a second link of the plurality of EMLSR links between the first MLD and the second MLD in an event that the frame exchange is started upon expiration of a backoff timer regarding the second link; and deferring, by the first MLD and responsive to the determining, the frame exchange to a time after an end of the reception of the one or more frames on the first link, wherein the deferring of the frame exchange comprises:

conducting a clear channel assessment (CCA) on the second link after an end of the reception of the one or more frames on the first link;

invoking at least one backoff procedure on the second link upon the CCA indicates the second link as clear for transmission; and initiating the frame exchange on the second link upon expiration of the at least one backoff procedure.

7. The method of claim 6, wherein the reception of one or more frames comprises reception of one or more group-addressed medium access control (MAC) protocol data units (MPDUs).

8. The method of claim 6, wherein the reception of one or more frames comprises reception of one or more beacon frames each comprising a delivery traffic indication message (DTIM).

9. The method of claim 6, wherein the frame exchange comprises transmission of a request-to-send (RTS) frame.

10. An apparatus implementable in a first multi-link device (MLD), comprising:

a transceiver configured to communicate wirelessly with a second MLD, wherein the first MLD is a non-access point (non-AP) MLD, wherein the second MLD is an access point (AP) MLD, and wherein the first MLD and the second MLD communicate wirelessly over a plurality of enhanced multi-link single-radio (EMLSR) links; and a processor coupled to the transceiver and configured to perform operations comprising:

determining that there is an overlap between reception, by the first MLD, of one or more frames from the second MLD on a first link of a plurality of EMLSR links between the first MLD and the second MLD and a frame exchange between the first MLD and the second MLD on a second link of the plurality of EMLSR links between the first MLD and the second MLD in an event that the frame exchange is started upon either:

expiration of a backoff timer regarding the second link, or receiving a soliciting frame regarding the second link; and refraining, responsive to the determining, from either:

initiating the frame exchange on the second link upon the expiration of the backoff timer responsive to the expiration of the backoff timer regarding the second link, or transmitting a solicited frame on the second link responsive to receiving the soliciting frame, wherein the refraining from initiating the frame exchange comprises deferring the frame exchange to a lime after an end of the reception of the one or more frames on the first link, and wherein the deferring of the frame exchange comprises:

conducting a clear channel assessment (CCA) on the second link after an end of the reception of the one or more frames on the first link;

invoking at least one backoff procedure on the second link upon the CCA indicates the second link as clear for transmission; and initiating the frame exchange on the second link upon expiration of the at least one backoff procedure.

11. The apparatus of claim 10, wherein the deferring of the frame exchange comprises initiating the frame exchange after a clear channel assessment (CCA) on the second link, which is conducted after the end of the reception of the one or more frames on the first link, indicates the second link as clear for transmission.

12. The apparatus of claim 10, wherein the reception of one or more frames comprises reception of one or more group-addressed medium access control (MAC) protocol data units (MPDUs).

13. The apparatus of claim 10, wherein the reception of one or more frames comprises reception of one or more beacon frames each comprising a delivery traffic indication message (DTIM).

14. The apparatus of claim 10, wherein the soliciting frame comprises a request-to-send (RTS) frame or a trigger frame, and wherein the solicited frame comprises a clear-to-send (CTS) frame or a trigger-based (TB) physical-layer protocol data unit (PPDU).

* * * * *